(12) United States Patent
Laroche

(10) Patent No.: US 11,274,565 B2
(45) Date of Patent: Mar. 15, 2022

(54) BLADED ASSEMBLY FOR A STATOR OF A TURBINE OF A TURBOMACHINE COMPRISING INCLINED SEALING RIBS

(71) Applicant: SAFRAN AIRCRAFT ENGINES, Paris (FR)

(72) Inventor: Clément Raphaël Laroche, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 37 days.

(21) Appl. No.: 16/542,407

(22) Filed: Aug. 16, 2019

(65) Prior Publication Data

US 2020/0063589 A1 Feb. 27, 2020

(30) Foreign Application Priority Data

Aug. 24, 2018 (FR) ...................................... 1857656

(51) Int. Cl.
   *F01D 5/14* (2006.01)
   *F01D 11/00* (2006.01)
   (Continued)

(52) U.S. Cl.
   CPC ............ *F01D 11/005* (2013.01); *F01D 5/142* (2013.01); *F16J 15/002* (2013.01); *F16J 15/062* (2013.01);
   (Continued)

(58) Field of Classification Search
   CPC ........ F01D 11/005; F01D 5/142; F01D 9/042; F01D 25/246; F01D 11/02;
   (Continued)

(56) References Cited

U.S. PATENT DOCUMENTS 3,702,193 A * 11/1972 Flegel et al. ............. F16J 15/02
   277/607
4,257,735 A * 3/1981 Bradley .................. F01D 11/02
   277/303

(Continued)

FOREIGN PATENT DOCUMENTS

EP   3203028 A1   8/2017
EP   3296519 A1   3/2018
FR   2944554 A1   10/2010

OTHER PUBLICATIONS

Search Report issued in French Patent Application No. 1857656 dated Apr. 16, 2019.

*Primary Examiner* — J. Todd Newton
*Assistant Examiner* — Theodore C Ribadeneyra
(74) *Attorney, Agent, or Firm* — Pearne & Gordon LLP

(57) ABSTRACT

A bladed assembly for a turbine of a turbomachine comprises an outer platform comprising, at an axial end, a transverse end surface and a sealing device protruding from the transverse end surface and comprising at least two sealing ribs (102) extending transversely to an axis of the bladed assembly and each having two respective sides which, in an axial cross-section, are radially and axially inclined in the same direction with respect to the axis. The radial direction of the inclination of the sides of the sealing ribs, in an axial cross-section, is the same for at least two of the sealing ribs. This particularity confers flexibility on each of the sealing ribs, which allows to favour a surface contact between the sealing ribs and a radial stator wall facing which the transverse end surface, and in particular the sealing device, are intended to be arranged.

11 Claims, 4 Drawing Sheets

(51) Int. Cl.
  *F16J 15/00* (2006.01)
  *F16J 15/06* (2006.01)
  *F16J 15/447* (2006.01)
  *F16J 15/44* (2006.01)
  *F01D 25/24* (2006.01)
  *F01D 9/04* (2006.01)

(52) U.S. Cl.
  CPC ............ *F16J 15/44* (2013.01); *F16J 15/445* (2013.01); *F16J 15/447* (2013.01); *F16J 15/4472* (2013.01); *F16J 15/4476* (2013.01); *F01D 9/042* (2013.01); *F01D 25/246* (2013.01); *F05D 2220/32* (2013.01); *F05D 2240/55* (2013.01)

(58) Field of Classification Search
  CPC ... F05D 2220/32; F05D 2240/55; F16J 15/02; F16J 15/002; F16J 15/062; F16J 15/44; F16J 15/445; F16J 15/447; F16J 15/4472; F16J 15/4476
  See application file for complete search history.

(56) References Cited

U.S. PATENT DOCUMENTS

| | | | |
|---|---|---|---|
| 7,445,213 B1* | 11/2008 | Pelfrey | F01D 11/02 277/418 |
| 8,002,286 B1* | 8/2011 | El-Aini | F01D 11/02 277/412 |
| 9,874,104 B2* | 1/2018 | Shapiro | F01D 25/246 |
| 10,316,675 B2* | 6/2019 | Kuwamura | F16J 15/4472 |
| 2008/0260522 A1* | 10/2008 | Alvanos | F01D 11/127 415/173.4 |
| 2009/0110549 A1 | 4/2009 | Snook et al. | |
| 2011/0229311 A1* | 9/2011 | Varanasi | F01D 11/04 415/170.1 |
| 2012/0107122 A1* | 5/2012 | Albers | F01D 25/246 416/179 |
| 2012/0200046 A1* | 8/2012 | Green | F01D 11/02 277/647 |
| 2013/0315708 A1* | 11/2013 | Rendon | F01D 11/005 415/110 |
| 2014/0248128 A1* | 9/2014 | Budnick | F01D 25/162 415/111 |
| 2015/0285380 A1* | 10/2015 | Nakagawa | F16J 15/002 277/351 |
| 2015/0354389 A1* | 12/2015 | Pack | F01D 5/06 416/204 A |
| 2016/0003078 A1* | 1/2016 | Stevens | F01D 11/005 277/647 |
| 2016/0003357 A1* | 1/2016 | Kanzaki | F16C 33/805 277/351 |
| 2016/0131257 A1* | 5/2016 | Sakai | B60B 27/0073 277/351 |
| 2016/0169022 A1* | 6/2016 | Davis | F16J 15/061 277/598 |
| 2017/0030214 A1* | 2/2017 | Strock | F01D 25/246 |
| 2017/0226876 A1* | 8/2017 | Rioux | F01D 9/00 |
| 2017/0292395 A1* | 10/2017 | Rioux | F01D 11/001 |

* cited by examiner

BLADED ASSEMBLY FOR A STATOR OF A TURBINE OF A TURBOMACHINE COMPRISING INCLINED SEALING RIBS

This application claims priority to French Patent Application No. 1857656 filed Aug. 24, 2018, the entire disclosure of which is incorporated by reference herein.

TECHNICAL FIELD

The present invention relates to a bladed assembly for a stator of a turbine of a turbomachine, comprising at least one blade extending radially with respect to an axis of the bladed assembly, and an outer platform and an inner platform connected to one another by the blade, or each blade, and having respective aerodynamic surfaces configured to define between them a fluid flow channel, wherein the outer platform comprises, at an axial end, a transverse end surface and a sealing device protruding from the transverse end surface.

The invention also relates to a set of guide vanes formed by one or more such bladed assemblies, as well as to a turbine comprising at least one such bladed assembly, and to a turbomachine comprising such a turbine.

PRIOR ART

In certain turbomachines, a turbine comprises at least one set of guide vanes formed by stator bladed assemblies of the type described above, also called distributor sectors, mounted circumferentially end to end, and a bladed wheel rotatably mounted downstream of the set of guide vanes inside a stator assembly comprising a radial wall arranged axially facing the transverse end surface and the sealing device of the outer platform of each bladed assembly.

The set of guide vanes in question can in particular be the set of guide vanes located at the inlet of the high-pressure turbines in certain twin-spool turbomachines.

The stator assembly typically comprises a turbine shroud arranged around the bladed wheel, at a small distance from radially outer ends of the blades of the bladed wheel, and a set of structures that are part of an outer casing of the turbine and are configured to carry the turbine shroud.

According to the turbomachine type, the aforementioned radial wall can be a wall of the outer casing of the turbine, carrying a flange on which the turbine shroud rests, or the radial wall can be a wall of the turbine shroud itself, optionally provided with a flange, and by which the turbine shroud is fastened to the outer casing of the turbine.

In all cases, it is particularly important to limit the potential leaks of air between the transverse end surface of the outer platform of each bladed assembly and the aforementioned radial wall.

For this purpose, the aforementioned sealing device in general takes the shape of a rib, shaped to bear against the radial wall or to come as close as possible to it, taking benefit of the fact that the bladed assembly undergoes a slight tilt about a respective transverse axis passing through the inner platform of the bladed assembly, under the effect of the axial pressure of the gases in the turbine, when the turbomachine is operating.

The effectiveness of the sealing device nevertheless remains limited because of phenomena of differential thermal expansions, which are in particular capable of causing deformations of each bladed assembly.

DISCLOSURE OF THE INVENTION

The goal of the invention is in particular to improve the effectiveness of such a sealing device.

For this purpose, according to the invention, the sealing device of a bladed assembly comprises at least two sealing ribs, extending transversely to the axis of the bladed assembly while being radially offset with respect to one another, and each having two respective sides which, in an axial cross-section, are radially and axially inclined in a same direction with respect to the axis of the bladed assembly in such a way that the radial direction of the inclination of the sides of the sealing ribs, in an axial cross-section, is the same for at least two of the sealing ribs, preferably for all the sealing ribs.

This particularity confers flexibility on each of the sealing ribs with respect to axial stresses, which allows to favour a surface contact between the sealing ribs and a radial stator wall facing which the transverse end surface, and in particular the sealing device, are intended to be arranged.

In preferred embodiments of the invention, each of the sealing ribs has a free end having a tapered shape.

Preferably, the sealing device comprises a base protruding on the transverse end surface and from which the sealing ribs extend.

Preferably, the sealing device has at least one connecting fillet at the junction between the transverse end surface and a sealing rib.

Preferably, the sealing ribs have respective axial ends axially offset one from the other or from one another, in such a way that the farther a sealing rib is from the axis of the bladed assembly, the closer its respective axial end is to the transverse end surface.

Preferably, each of the sealing ribs has a rectilinear shape, in a cross-section transverse to the axis of the bladed assembly.

The invention also relates to a set of guide vanes for a turbine of a turbomachine, formed by bladed assemblies of the type described above mounted circumferentially end to end, in such a way that the set of guide vanes extends over 360 degrees about the axis of the bladed assembly.

Alternatively, a set of guide vanes according to the invention can be formed by a single bladed assembly of the type described above, extending in one piece over 360 degrees about the axis of the bladed assembly.

The invention also relates to a turbine for a turbomachine, comprising at least one bladed assembly of the type described above, and a bladed wheel rotatably mounted downstream of the bladed assembly inside a stator assembly, wherein the stator assembly comprises a radial wall arranged axially facing the transverse end surface and the sealing device of the outer platform of the bladed assembly.

Finally, the invention relates to a turbomachine, comprising a turbine of the type described above.

In preferred embodiments of the invention, each of the sealing ribs has two end surfaces connected to one another in such a way as to form an end edge and respectively connected to the two sides of the sealing rib thereby respectively forming two intermediate edges.

Moreover, one of the two end surfaces is advantageously shaped to come in contact with the radial wall.

BRIEF DESCRIPTION OF THE DRAWINGS

The invention will be better understood, and other details, advantages and features thereof will appear upon reading the following description given as a non-limiting example and in reference to the appended drawings in which.

In all of these drawings, identical references can designate identical or analogous elements.

DETAILED DISCLOSURE OF PREFERRED EMBODIMENTS

Figure 1:
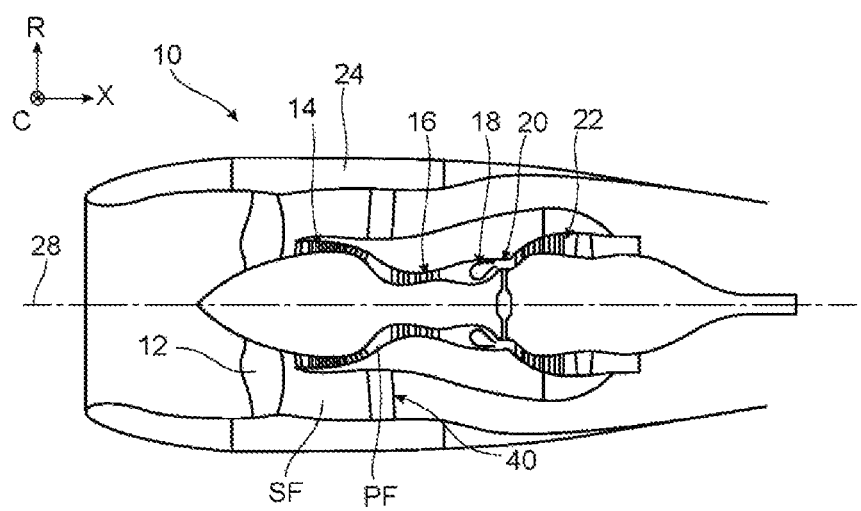
FIG. 1 is a schematic view of an axial cross-section of a turbomachine of a known type.

FIG. 1 illustrates a turbomachine 10 for an aircraft of a known type, comprising in general a fan 12 configured for the intake of a flow of air dividing downstream of the fan into a primary flow circulating in a primary-flow flow channel, hereinafter called primary flow PF, in a core of the turbomachine, and a bypass flow bypassing this core in a bypass-flow flow channel, hereinafter called secondary flow SF.

The turbomachine is for example of the dual-flow and dual-body type. Th core of the turbomachine thus comprises, in general, a low-pressure compressor 14, a high-pressure compressor 16, a combustion chamber 18, a high-pressure turbine 20 and a low-pressure turbine 22.

The respective rotors of the high-pressure compressor and of the high-pressure turbine are connected by a shaft called "high-pressure shaft", whereas the respective rotors of the low-pressure compressor and of the low-pressure turbine are connected by a shaft called "low-pressure shaft", in a well-known manner.

The turbomachine is faired by a nacelle 24 surrounding the secondary flow SF. Moreover, the rotors of the turbomachine are rotatably mounted about a longitudinal axis 28 of the turbomachine.

Throughout this description, the axial direction X is the direction of the longitudinal axis 28. The radial direction R is in all points a direction orthogonal to the longitudinal axis 28 and passing through the latter, and the circumferential direction C is in all points a direction orthogonal to the radial direction R and to the longitudinal axis 28. The terms "inner" and "outer" respectively refer to a relative closeness, and relative remoteness, of an element with respect to the longitudinal axis 28. Finally, the "upstream" and "downstream" directions are defined in reference to the general direction of the flow of the gases in the primary flow PF and secondary flow SF of the turbomachine, according to the axial direction X.

Figure 2:
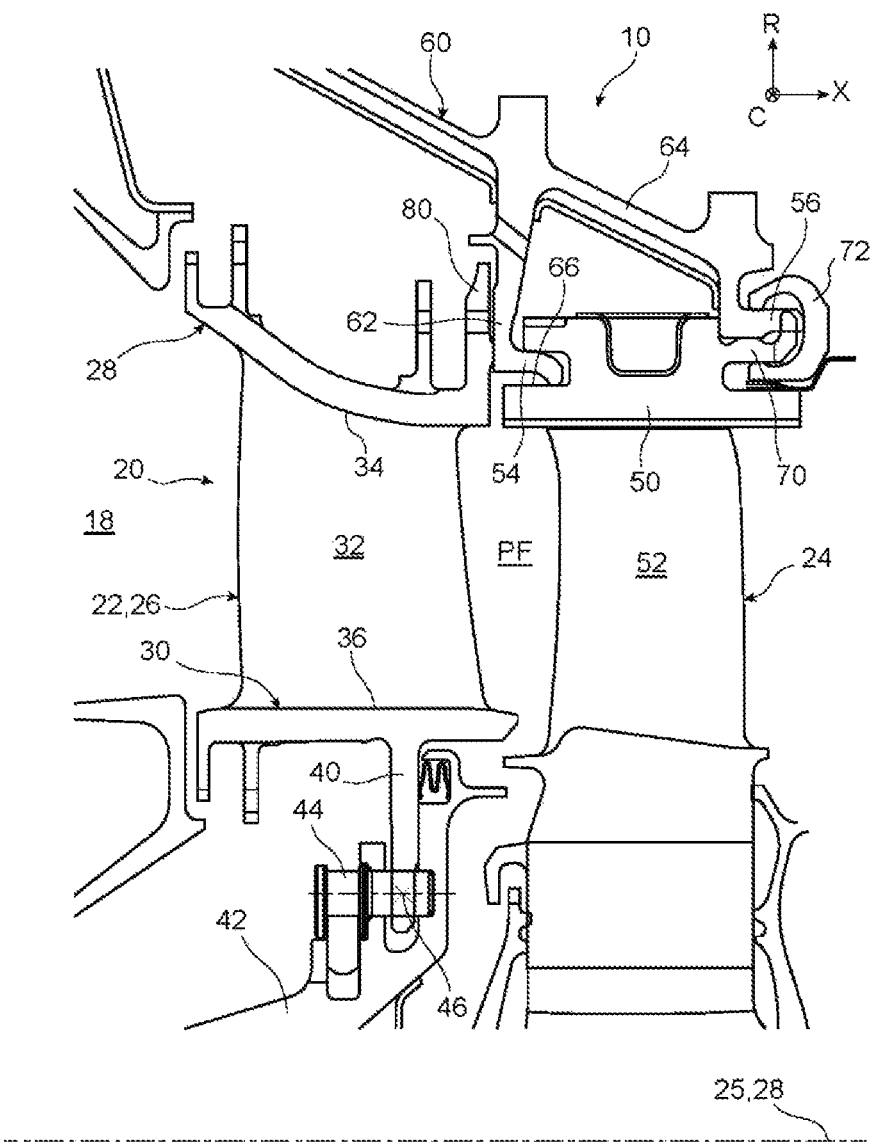
FIG. 2 is a partial schematic view of an axial cross-section of a high-pressure turbine of the turbomachine of FIG. 1.

FIG. 2 illustrates the high-pressure turbine 20 of the turbomachine 10. This high-pressure turbine 20 comprises a set of guide vanes 22 mounted at the output of the combustion chamber 18, and a bladed wheel 24 rotatably mounted downstream of the set of guide vanes 22.

The set of guide vanes 22 is formed by bladed assemblies 26, also called distributor sectors, mounted circumferentially end to end about a shared axis 25 of each bladed assembly 26, which is the same as the longitudinal axis 28 of the turbomachine, in such a way that the set of guide vanes 22 extends all around the axis 25 of each bladed assembly 26.

Alternatively, the set of guide vanes 22 can be formed by a single bladed assembly 26 extending continuously all around the axis 25 of the bladed assembly 26.

In the present description, an axial plane is a plane containing the axis 25 of each bladed assembly 26, whereas the term "transverse" refers to any element orthogonal to the axis 25 of each bladed assembly 26.

Each of the bladed assemblies 26 comprises an outer platform 28 and an inner platform 30 connected to each other by one or more blades 32. The outer platform 28 and inner platform 30 have respective aerodynamic surfaces 34 and 36 defining between them a portion of the primary flow PF.

The set of the respective outer platforms 28 of the bladed assemblies 26 forms an outer guide-vane shroud, whereas the set of the respective inner platforms 30 of the bladed assemblies 26 forms an inner guide-vane shroud. The outer and inner guide-vane shrouds respectively form two coaxial structures of revolution.

The inner guide-vane shroud comprises an inner radial annular flange 40 maintained rigidly connected to an inner casing 42 of the turbine by pins 44. More precisely, each bladed assembly 26 comprises a plurality of pins 44, for example two, arranged on a respective tilting axis 46 perpendicular to a median axial plane of the bladed assembly, in such a way as to allow a slight tilting of the bladed assembly about the tilting axis 46, in particular under the effect of an axial thrust exerted by the gases flowing downstream in the turbine.

Moreover, the bladed wheel 24 is surrounded by a sectorised sealing ring 50, also called a turbine shroud, arranged at a small distance from the tip of the blades 52 of the bladed wheel 24 in such a way as to best reduce the flow of the air between the end of the blades 52 and the sealing ring 50.

To this end, the sealing ring 50 is suspended from an upstream flange 54 and a downstream flange 56, which are rigidly connected to an outer casing 60 of the high-pressure turbine 20.

The upstream flange 54 is formed at the radially inner end of a radial wall 62 having an annular shape belonging to the outer casing 60 and extending radially towards the inside from an outer shroud 64 of the outer casing 60. The upstream flange 54 extends downstream from the radial wall 62 and is inserted into an annular groove 66 of the sealing ring 50 in such a way as to contribute to the support of the latter.

The downstream flange 56 is connected to a corresponding flange 70, formed at the downstream end of the sealing ring 50, by a locking member 72, in such a way as to also contribute to the support of the sealing ring 50.

The outer platform 28 of each bladed assembly 26 comprises, at its downstream end, a transverse end wall 80 having a transverse end surface 82 (FIG. 3), which extends facing and at a distance from the radial wall 62 of the outer casing 60. The transverse end wall 80 comprises a sealing device 90 protruding from the transverse end surface 82.

Figure 3:
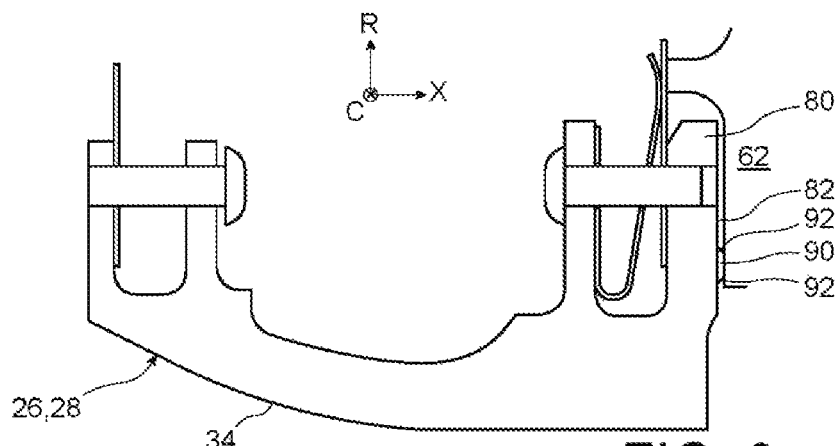
FIG. 3 is a view, on a greater scale, of a portion of FIG. 2.

In the turbomachine of the known type illustrated in FIGS. 1 to 3, the sealing device 90 of each bladed assembly 26 is formed by a rib. The latter has a rectilinear shape and is parallel to the tilting axis 46 (FIG. 2) of the bladed assembly. The rib thus appears to be rectilinear when viewing the cross-section of the turbine transverse to the axis 25. Moreover, in an axial cross-section, the rib extends in a direction parallel to the axis 25 (and thus parallel to the axial direction X). The rib is optionally provided with bevels 92 at its radially outer and radially inner side (FIG. 3).

The set of the respective sealing devices 90 of the bladed assemblies 26 globally forms a rib having a polygonal shape in a transverse cross-section, extending about the axis 25.

During operation, the rib formed by the set of the sealing devices 90 allows to limit the passage of air or of combustion gas between the walls 62 and 80. For this purpose, the rib bears against the radial wall 62 when the turbomachine is in operation.

However, because of the intense heat of the gases coming from the combustion chamber 18 and circulating in the turbine, the set of guide vanes 22 and the outer casing 60 are subjected to phenomena of differential expansions, capable in particular of causing non-axisymmetric deformations of each of the bladed assemblies 26.

Therefore, the rib formed by the set of the sealing devices 90 can be simultaneously in contact with the radial wall 62, at certain locations, and be spaced apart from it in a relatively significant manner, in other locations.

These phenomena of differential expansions also tend to reduce the effectiveness of the sealing devices 90.

Figure 4:
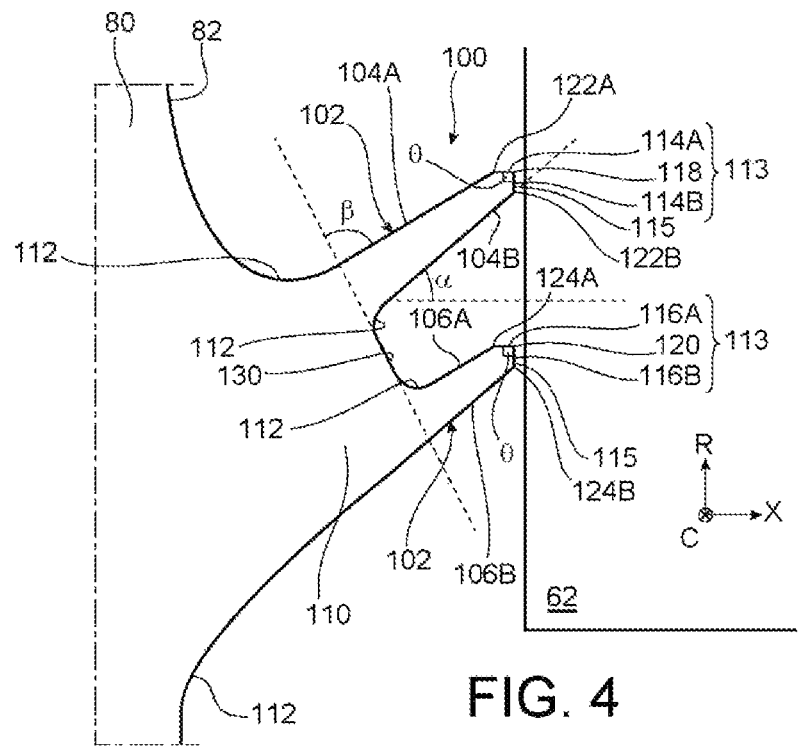
FIG. 4 is a partial schematic view of an axial cross-section of a distributor sector for a turbine of a turbomachine according to a preferred embodiment of the invention.

The invention allows to overcome, at least partially, this problem, by providing each bladed assembly 26 with an improved sealing device 100, an example of which is illustrated in FIG. 4, and which is provided to replace the sealing device 90 described above.

Instead of a single rib protruding axially downstream, this sealing device 100 comprises a plurality of sealing ribs 102, for example two, each having an inclined overall orientation, and offset from one another in the radial direction R.

More precisely, the sealing ribs 102 extend transversely to the axis 25, like the sealing device 90 described above, but the sealing ribs 102 each have two respective sides 104A, 104B, respectively 106A, 106B, which, in an axial cross-section, are inclined radially and axially in the same direction with respect to the axis 25 (and thus with respect to the axial direction X). This should be understood as meaning that the two respective sides 104A, 104B or 106A, 106B of each sealing rib are either both inclined radially towards the outside in the downstream direction, like in FIG. 4, or both inclined radially towards the inside in the downstream direction.

This particularity confers flexibility on each of the sealing ribs 102 of the sealing device 100, which allows to favour a surface contact between the sealing ribs 102 and the radial wall 62 over the entire circumferential extension of the sealing ribs 102.

In certain operational situations, certain circumferential portions of a sealing rib 102 can for example be slightly compressed against the radial wall 62 and thus allow circumferentially adjacent portions of the sealing rib to preserve contact with the radial wall 62 despite non-axisymmetric deformations of the set of guide vanes which, with the sealing device 90 of the known type, would have led to such adjacent portions being spaced apart from the radial wall 62.

In other operational situations, the compression of a sealing rib 102 can take place over the entire circumferential extension of the sealing rib, and allow to favour a surface contact with the radial wall 62, whereas the sealing device 90 of the known type would have only allowed a linear contact (that is to say, along a transverse contact line) in the same type of operational situation.

The angle α of inclination of each side 104A, 104B, 106A, 106B with respect to the axial direction X is preferably between 15 degrees and 75 degrees, even more preferably between 15 degrees and 60 degrees.

Moreover, the radial direction (towards the outside or towards the inside) of the inclination of the sides 104A, 104B, 106A, 106B of the sealing ribs 102, in an axial cross-section, is the same for the two sealing ribs 102. In this case, the two sealing ribs have their sides inclined radially towards the outside in the downstream direction.

This particularity increases the chances that at least one of the sealing ribs 102 ensures surface contact with the radial wall 62, in a wide variety of operational conditions.

In preferred embodiments, as illustrated by FIG. 4, the sealing device 100 comprises a base 110 protruding on the transverse end surface 82 and from which the sealing ribs 102 extend.

Such a base allows to increase the robustness of the sealing device 100.

Alternatively or in addition, the sealing device 100 advantageously has one or more connecting fillets 112 at the junction between the transverse end surface 82 and one or more sealing ribs 102. The connecting fillets 112 also allow to increase the robustness of the sealing device 100.

In general, each of the sealing ribs 102 advantageously has a free end 113 having a tapered shape. Thus, if one (or more) circumferential portion of the free end 113 is spaced apart from the radial wall 62 during operation, the free end 113 allows to disturb the flow of air or of combustion gas and thus limit the leak between the sealing device 100 and the radial wall 62.

In the preferred embodiment of the invention, each of the sealing ribs 102 thus has two end surfaces 114A, 114B, respectively 116A, 116B, connected to one another while forming an end edge 118, respectively 120. The end surfaces 114A, 114B, 116A, 116B, are respectively connected to the two sides 104A, 104B or 106A, 106B of the corresponding sealing rib 102 while respectively forming two intermediate edges 122A, 122B, respectively 124A, 124B.

The two end surfaces 114A, 114B, or 116A, 116B advantageously form between them an angle θ that is acute or right.

The end edge 118, 120 thus forms an effective means for disturbing a possible gaseous flow between the corresponding sealing rib 102 and the radial wall 62.

In the embodiment illustrated in FIG. 4, one of the two end surfaces 114B, 116B of each rib 102, which forms an axial end 115 of the rib, is configured to extend orthogonally to the axis 25 (and thus orthogonally to the axial direction X), directly facing the radial wall 62, and preferably bearing on the latter, when the turbomachine is operating.

This configuration allows, again, to favour a surface contact between each rib 102 in question and the radial wall 62.

As shown by FIG. 4, the base 110 has, between the sealing ribs 102, an end surface 103 forming, in an axial cross-section, an angle β, between 70 degrees and 110 degrees, with each of the sides 104A, 104B, 106A, 106B of the sealing ribs 102.

Moreover, the sealing device 100 is advantageously made in one piece with the transverse end wall 80.

Alternatively, the sealing device 100 can nevertheless be attached onto the transverse end wall 80 without going beyond the context of the invention.

Figure 5:
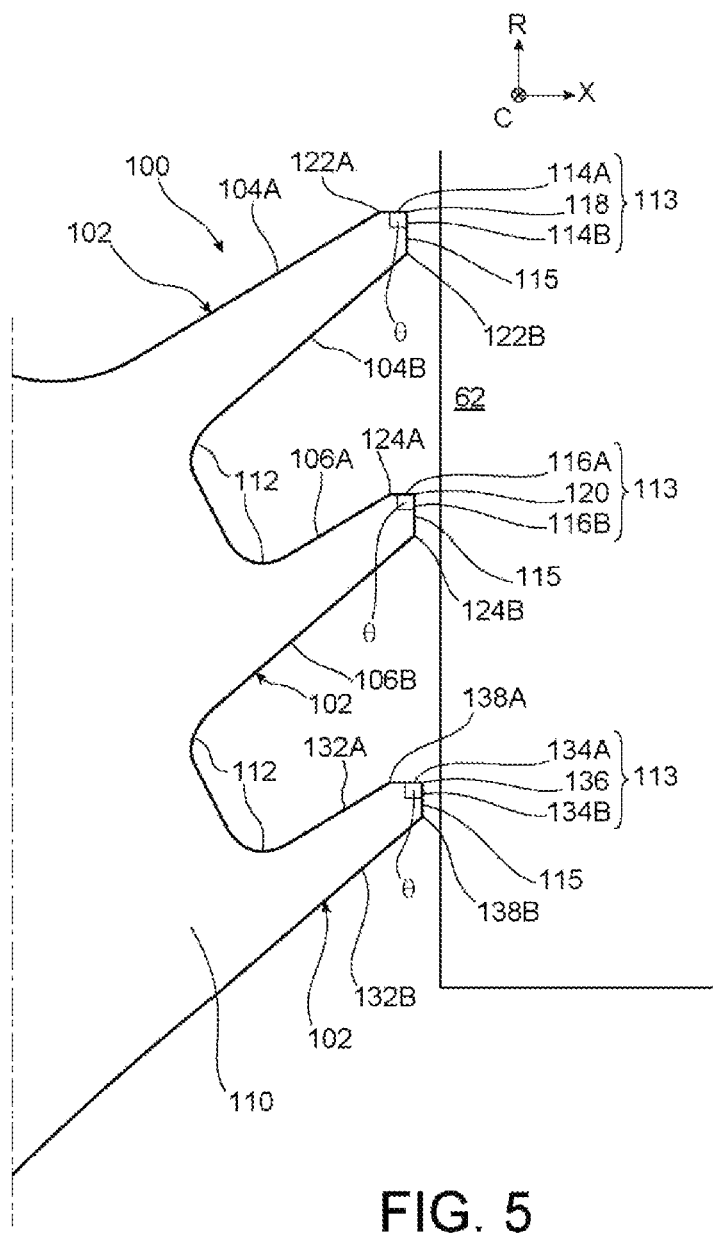
FIG. 5 is a partial schematic view of an axial cross-section of a distributor sector for a turbine of a turbomachine according to another preferred embodiment of the invention.

FIG. 5 illustrates another preferred embodiment of the invention, in which the sealing device 100 comprises a third sealing rib 102 similar to the two ribs already described in reference to FIG. 4.

Thus, the third sealing rib 102 has two respective sides 132A, 132B which, in an axial cross-section, are inclined radially and axially in the same direction with respect to the axis of the bladed assembly 25.

Moreover, the third sealing rib 102 has two end surfaces 134A, 134B connected to each other while forming an end edge 136. The two end surfaces 134A, 134B are respectively connected to the two sides 132A, 132B of the third sealing rib 102 while respectively forming two intermediate edges 138A, 138B. The two end surfaces 134A, 134B advantageously form between them an angle θ that is acute or right.

In the example illustrated in FIG. 5, the respective axial ends 115 of the three sealing ribs 102 are axially offset from one another (when the turbomachine is off). More precisely, the farther a sealing rib 102 is from the axis 25, the closer its respective axial end 115 is to the transverse end surface 82.

Therefore, when the bladed assembly 26 tilts slightly about the tilting axis 46, during operation, the respective axial ends 115 of the three sealing ribs 102 are approximately aligned in the radial direction, which allows to favour simultaneous bearing of each of the sealing ribs 102 on the radial wall 62.

Of course, the feature above relative to the axial offsetting of the respective axial ends 115 of the sealing ribs 102 applies regardless of the number of ribs, for example in the case in which there are two sealing ribs like in FIG. 4.

The invention claimed is:

1. A bladed assembly for a stator of a turbine of a turbomachine, comprising at least one blade extending radially with respect to an axis, an outer platform and an inner platform connected to one another by the at least one blade and having respective aerodynamic surfaces configured to define between them a fluid flow channel, wherein the outer platform comprises, at an axial end, a transverse end surface and a sealing device protruding from the transverse end surface, wherein the sealing device comprises at least two sealing ribs extending transversely to the axis while being radially offset with respect to one another and each having two respective sides which, in an axial cross-section, are radially and axially inclined in a same direction with respect to the axis and wherein the radial direction of the inclination of the sides of the sealing ribs, in an axial cross-section, is the same for at least two of the sealing ribs, wherein a respective angle of inclination of each side of each sealing rib with respect to said axis is between 15 degrees and 75 degrees.

2. The bladed assembly according to claim 1, wherein each of the sealing ribs has a free end having a tapered shape.

3. The bladed assembly according to claim 1, wherein the sealing device comprises a base protruding on the transverse end surface and from which the sealing ribs extend.

4. The bladed assembly according to claim 1, wherein the sealing device has a connecting fillet at the junction between the transverse end surface and at least one of the sealing ribs, or between the transverse end surface and the base.

5. The bladed assembly according to claim 1, wherein the sealing ribs have respective axial ends axially offset from one another in such a way that the farther a sealing rib is from the axis of the bladed assembly, the closer its respective axial end is to the transverse end surface.

6. The bladed assembly according to claim 1, wherein each of the sealing ribs has a rectilinear shape in a cross-section transverse to the axis.

7. A set of guide vanes for a turbine of a turbomachine, formed by a plurality of the bladed assemblies according to claim 1 mounted circumferentially end to end, in such a way that the set of guide vanes extends over 360 degrees about the axis.

8. A turbine for a turbomachine, comprising the bladed assembly according to claim 1, and a bladed wheel rotatably mounted downstream of the bladed assembly inside a stator assembly, wherein the stator assembly comprises a radial wall arranged axially facing the transverse end surface and the sealing device of the outer platform of the bladed assembly in such a way that the sealing ribs each have a respective free end facing or in contact with the radial wall.

9. A turbomachine, comprising the turbine according to claim 8.

10. The turbomachine according to claim 9, wherein each of the sealing ribs has, at its free end, two end surfaces connected to one another in such a way as to form an end edge and respectively connected to the sides of the sealing rib thereby respectively forming two intermediate edges, one of the two end surfaces being configured to come in contact with the radial wall.

11. A bladed assembly for a stator of a turbine of a turbomachine, comprising a blade extending radially with respect to a longitudinal axis of the turbomachine, an outer platform and an inner platform connected to one another by the blade and having respective aerodynamic surfaces defining a flow channel, wherein the outer platform comprises a transverse end surface and a sealing device protruding from the transverse end surface, wherein the sealing device comprises at least two sealing ribs each having two respective sides which are radially and axially inclined in a same direction with respect to the longitudinal axis, wherein a respective angle of inclination of each side of each sealing rib with respect to the longitudinal axis is between 15 degrees and 75 degrees.

* * * * *